March 19, 1940.   R. S. THOMPSON   2,194,249
BALANCING RECIPROCATING ELEMENT
Filed Sept. 19, 1938   3 Sheets-Sheet 1
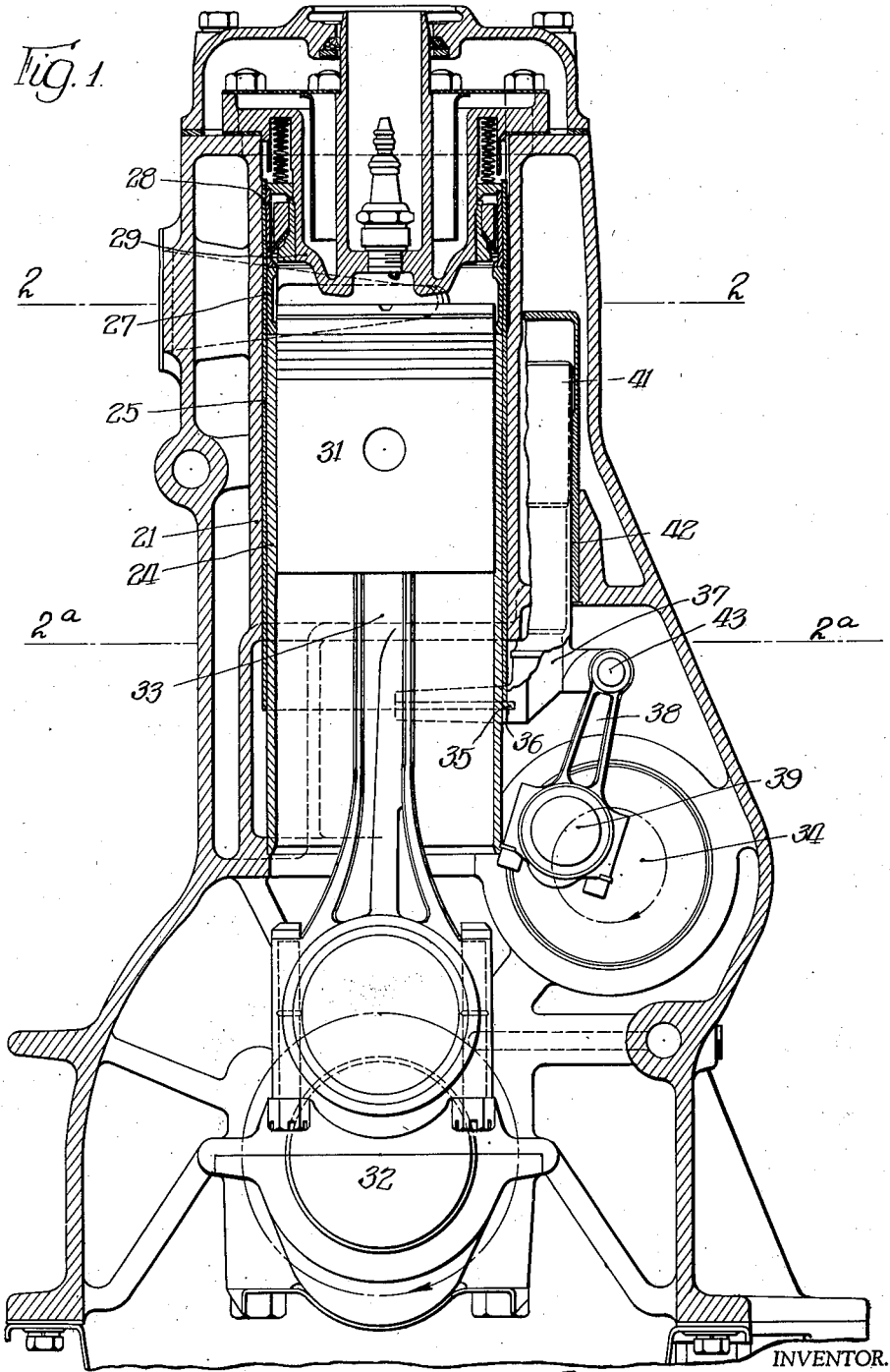
INVENTOR.
BY Ransom S. Thompson
Walter M. Fuller
ATTORNEY.

March 19, 1940. R. S. THOMPSON 2,194,249
BALANCING RECIPROCATING ELEMENT
Filed Sept. 19, 1938 3 Sheets—Sheet 2
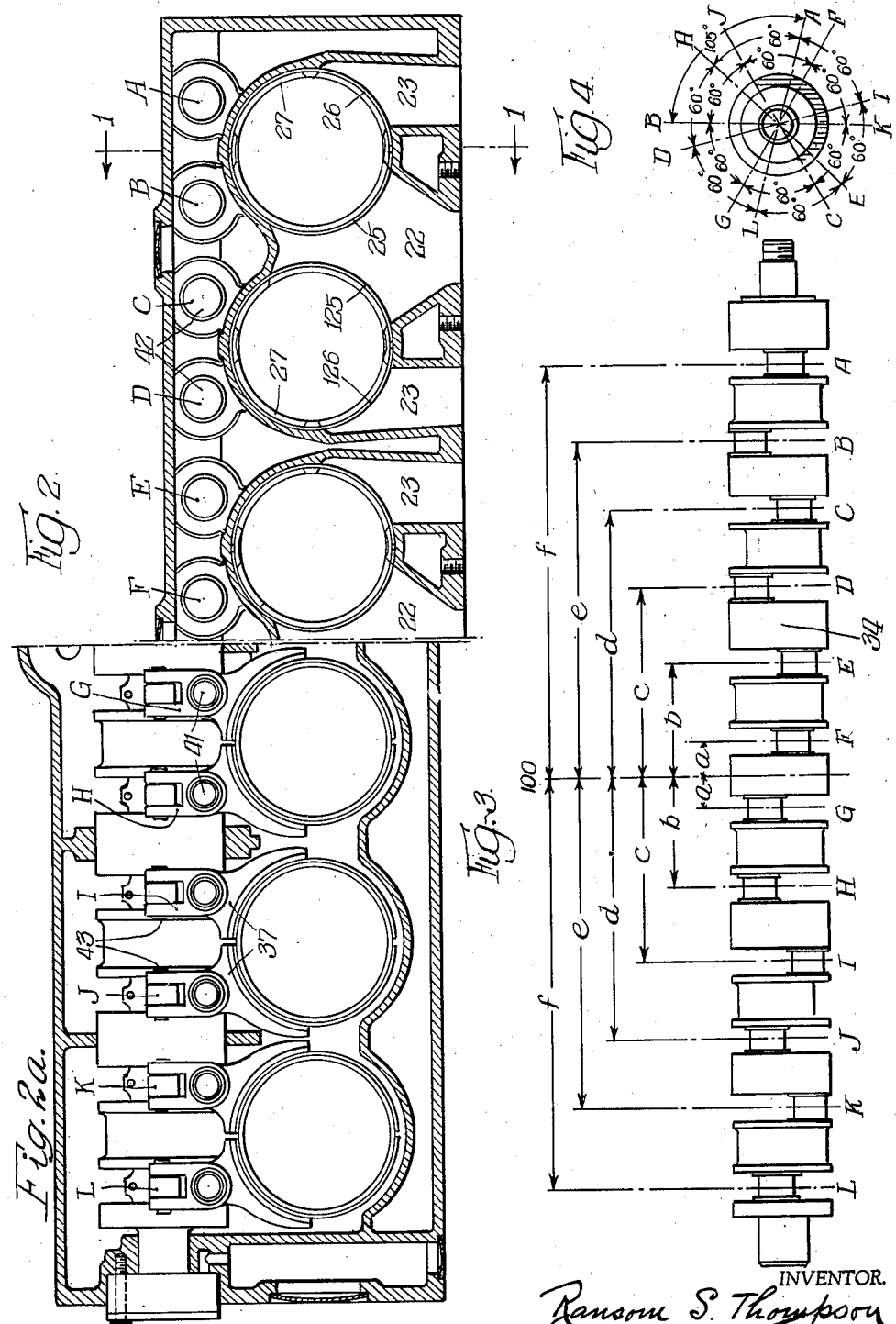
INVENTOR.
Ransom S. Thompson
BY Walter M. Fuller
ATTORNEY.

March 19, 1940.       R. S. THOMPSON       2,194,249
BALANCING RECIPROCATING ELEMENT
Filed Sept. 19, 1938        3 Sheets-Sheet 3

INVENTOR.
Ransom S. Thompson
BY Walter M. Fuller
ATTORNEY.

Patented Mar. 19, 1940

2,194,249

UNITED STATES PATENT OFFICE 2,194,249

BALANCING RECIPROCATING ELEMENT

Ransom S. Thompson, Detroit, Mich., assignor to Skinner Motors, Inc., Detroit, Mich., a corporation of Delaware Application September 19, 1938, Serial No. 230,612

5 Claims. (Cl. 123—75)

One leading object of the present invention is to improve the condition of dynamic balance of a system of reciprocating masses by so selecting the weight or mass of one or of several of the reciprocating members of the assemblage that the total unbalanced force and/or couple produced by the system as a whole is reduced or eliminated without, or in addition to, changes in the phase relationship of the various elements or members of the system one to the other, and without the addition of extra members to the system.

Heretofore, as far as I am advised, such desirable balancing has been effected, in the case of the valve-gear of an internal-combustion engine, only by the addition of supplemental or auxiliary parts designed, built, and installed for the express or specific purpose of reducing the vibration and by the use of the most advantageous available phase-relationship of the various reciprocating members of the system.

The problem of producing a balanced condition in the valve-gear of a reciprocating internal-combustion engine or analogous construction is more difficult than the balance issue in most other forms of machinery, because of the fact that the correlated positions of the various reciprocating parts of the valve-mechanism is determined by the relative locations of the major reciprocating members of the engine, such as the piston, etc., and the relations of these heavier elements are closely restricted by the necessity of maintaining a condition of balance throughout their portion of the engine.

There are only a comparatively few arrangements of the major engine members that may be employed without disturbing the balance of this portion of the engine, and, once these systems have been investigated to determine which one of them results in the best condition of valve-gear balance, that plan should be adopted in order to reduce to a minimum the total unbalanced forces and/or couples acting on the engine.

In any four-cycle engine employing more than one cylinder, the resultant unbalanced forces and/or couples produced by the valve-gear will be, in reality, the vector sum of forces and/or couples produced by the various reciprocating parts of the valve-gear.

These forces and/or couples brought about by the valve-gear are reduced or eliminated, through the employment of the present invention, by so changing the masses of the various reciprocating members thereof that the forces and/or couples produced by these members tend to reduce the magnitude of the resultant force and/or couple. This, it is believed, is an application of an entirely new fundamental principle.

Systems of reciprocating masses have been put in balance, in the past, by either one of two methods:—(a) so arranging the phase of several equal masses that they balanced each other, or (b) adding to the system new supplemental moving parts of such mass and phase that these new parts counteracted the unbalanced forces and/or couples produced by the former mechanism.

However, in the present instance, a number of reciprocating masses, whose phase relation is fixed by outside requirements, are present in a system that is normally not entirely free from unbalanced forces and/or couples, and the system is placed in improved balance without changing the phase relationship of its component parts and without the addition of any moving parts to the system, but rather by merely so changing the mass or masses of some of the members of the system that the resultant unbalanced force and/or couple is greatly reduced, whereby the conditions of balance of a given system of reciprocating elements is improved, without the employment of any supplemental moving parts, by changing, not the phase relationship of the various members of the system, but by modifying their actual masses.

The style of engine on which the instant invention is in use is a six-cylinder, four-cycle, internal-combustion, gasoline engine of the slide-valve type designed for automotive and other uses and such engine will, therefore, be employed as an illustration of the method of balance used, and, while this is applicable to the valve-gear of any multi-cylinder engine having a total of three or more valves, the mechanical difficulties encountered in this application are less with a multi-cylinder, four-cycle, slide-valve type than with other styles of engines.

Such six-cylinder internal-combustion engine in which this balance method is in use employs a single, rotary, valve crank-shaft of twelve throws along one side of the engine and all twelve slide-valves of the engine (6 intake and 6 exhaust) are reciprocated by this single shaft by means of small connecting-rods, characterized valve-rods, and cross-head or guide members, called valve-lugs, the straight-line sliding motion of such valve-lugs being transmitted directly to the slide-valves proper by virtue of the fact that such lugs or guides drive the valves through appropriate tongue-and-groove connections.

Each valve-lug or guide-member, together with the valve to which it is operatively connected, constitutes a reciprocating mass and the motions of these masses produce unbalanced forces or couples in the engine-frame.

If it were possible to vary the angular relation, or phase angle, between the various throws of the valve-shaft for the purpose of improved valve-gear balance, without respect to its effect upon the timing of the valve-events in the engine-cylinders, the entire valve-gear could be simply balanced by conventional methods, but, this is impossible, as the timing, or phase relationship, of the various valves is dictated by the requirement that the intake and exhaust valves of each cylinder must be opened and closed when the piston of that cylinder is at certain points in its cycle of operation.

Since the phase relationship between the various pistons of the engine is, in turn prescribed by the fact that the piston and connecting-rod mechanism of the engine must be kept in balance, the opportunities for modifying the angles between the several throws on the valve-shaft (variations in the phase relationship of the valves) are strictly limited.

When the throws or crank-pins of the valve crank-shaft have been arranged to give the best available condition of balance in the valve-gear without disturbing the other functions of the engine, a vector-analysis is made to determine the magnitude and phase of the unbalanced forces and/or couple still remaining in the engine.

In the case of the six-cylinder engine referred to, it was discovered that the free forces in the system were opposed by equal and opposite forces acting on different center-lines, and, therefore, the forces were balanced, but an unbalanced primary couple was still left in the mechanism.

The vector-analysis which revealed this couple disclosed also the magnitude and phase of the couple, and, in addition, the manner in which it resulted from the vector addition of the twelve couples produced by the motion of the twelve valve-assemblies.

This vector-analysis, therefore, revealed which valve-assemblies were producing couples tending to add to the resultant and also which assemblies were producing couples tending to reduce the resultant, and, having this information, it was necessary to ascertain some method of greatly increasing the magnitude of those couples which contributed to the reduction of the resultant without increasing the magnitude of those couples which served to increase the resultant.

This was accomplished by increasing the mass of those valve-assemblies whose couples were to be augmented while leaving at their former weight or mass or lessening the mass of the other assemblies, and, by this course, the primary unbalanced couple in the valve-gear was eliminated, although a small secondary force was introduced, but, in this particular instance, such secondary force was not sufficiently large to cause any noticeable vibration, and was, therefore, neglected, although, had it been objectionable, it could have been counterbalanced by the introduction of a very slight, primary unbalance in the piston mechanism so timed as to be 180° out of phase with the secondary valve-shaft unbalance.

In any case, where the secondary unbalance, introduced into the valve-gear by efforts to improve the primary balance, becomes unallowable, it can be reduced or done away with by a redistribution of added weight among the valve-assemblies, provided that the weight differential between heavy assemblies and light assemblies is made sufficient to accomplish this result.

The operation of this novel, balanced mechanism is such that, as the valve-shaft is rotated, the primary unbalanced reciprocating forces and/or couples produced by any valve-assembly or group of valve-assemblies is always balanced by the primary reciprocating forces and/or couples produced by the remaining valve-assembly or assemblies.

One outstanding and prominent valuable feature of this new construction is that any system of reciprocating masses, whose phase relationship one to the other is fixed by some requirement other than that of dynamic balance, may be brought into an improved condition of dynamic balance merely by the addition to, or removal from, the mass of some or of all of the reciprocating members of the system.

The construction referred to was developed for use with the valve-gear of an internal-combustion, slide-valve engine, but it is applicable to the valve-gear of any engine in which the valves have reciprocating motion, provided that there are three or more valves in the engine, this construction being also capable of satisfactory use for a system of reciprocating weights other than the valve-gear of an engine.

In a general way, it will be apparent that the present invention involves the use of different weights or masses for the various members of a system of reciprocating masses, in order that the dynamic balance of the system may be improved over that which would be obtained by using equal reciprocating masses at the stations.

Referring to the accompanying drawings by means of which the instant invention is illustrated and throughout the views of which like reference numerals designate the same parts:

Figure 1 is a fragmentary, vertical cross-section, on a larger scale, on line 1—1 of Figure 2, through one cylinder of a multi-cylinder, slide-valve, internal-combustion engine of the type referred to above;

Fig. 2 illustrates a horizontal section through the entire engine on the section line 2—2 as shown in Fig. 1;

Fig. 2a illustrates a horizontal section through the entire engine on the section line 2a—2a as shown in Fig. 1;

Figure 3 shows the eccentric or crank-shaft for operating the twelve slide-valves of the engine;

Figure 4 depicts the timing of such valve-shaft;

Figure 8:
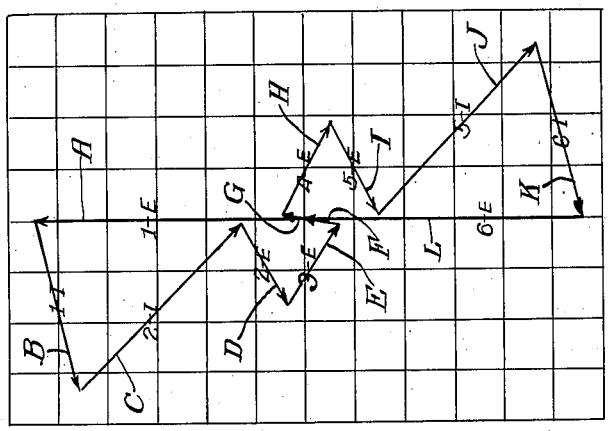
Figure 7:
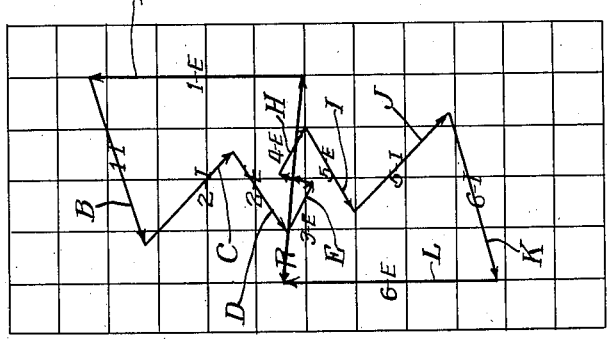
Figure 6:
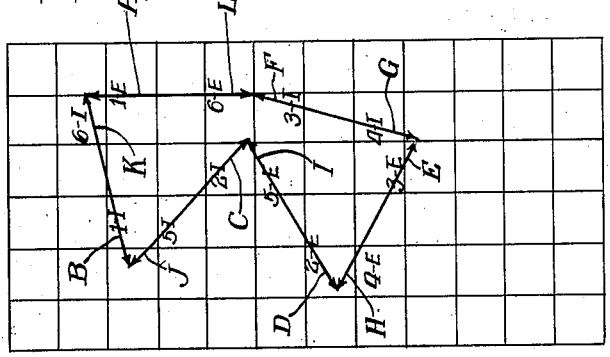
Figure 5:
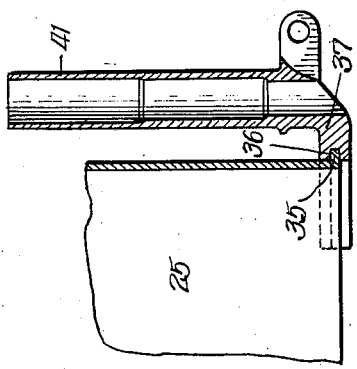

Figure 5 presents in section the tongue and groove connection between one of the slide-valves and its operating mechanism; and Figures 6, 7 and 8 are vector diagrams.

Referring to these drawings, it will be seen that the illustrated internal-combustion engine is of the six-cylinder, in-line type, each such cylinder comprising an outer, water-jacketed cylinder 21 having inlet and exhaust ports 22, 23, respectively (Fig. 2) and inside of such outer cylinder, concentric therewith, and spaced a small distance therefrom is a shorter, unported, inner cylinder 24 supported in any approved manner, but preferably from its lower end.

Substantially semi-cylindrical, ported intake and exhaust valves 25 and 26, respectively, are located in, and reciprocate lengthwise in, the annular space between the two companion cylinders.

A split, resilient, pressure-sealing ring 27 having ports in register with those of the outer cylinder rests on the top end of the inner cylinder 24 and presses outwardly against those portions of the slide-valves above the inner cylinder.

Above, and bearing down on, such sealing-ring 27 is an endless, hold-down ring 28.

The head 29 for the outer cylinder and its several associated parts mentioned above are or may be substantially like those presented in United States Patent No. 1,830,137 and need not be here detailed.

Each inner cylinder has its reciprocatory piston 31 joined to the engine main crank-shaft 32 by its individual connecting-rod 33 in the usual way.

All of the twelve slide-valves of the engine are reciprocated by a suitably-journaled, single, valve crank-shaft 34 along one side of the engine and rotated at one-half engine speed by the main crank-shaft 32 by any approved means, such as gears or sprocket-wheels and sprocket-chain, not shown, each such valve, at its lower end, having an outstanding, curved rib 35 occupying a similarly-shaped groove 36 in the valve-lug 37 operatively associated with its particular throw 39 of the valve-shaft 34 by a connecting-rod 38.

Each such valve lug or operating-member 37 has a hollow, upstanding, cylindrical cross-head or guide 41 which slides up and down in a bearing 42 parallel to the companion cylinders, such guide taking all side strains and twisting tendencies which might otherwise be imposed upon the valve.

Referring to Figure 2, it will be perceived that four different types of valves are employed in that 26 is a left-hand exhaust-valve, 126 is a right-hand exhaust-valve, 125 is a left-hand intake-valve and 25 is a right-hand intake-valve and, similarly, right and left hand valve-lugs are used to operate the valves.

In an engine construction of this character with the particular type of valve-gear shown and described, inertia forces are set up by the reciprocating motions of the valves, valve lugs or guides, and the small ends of the valve connecting-rods.

A single valve-assembly comprises a valve, a valve lug or guide, a valve connecting-rod, and a connecting-rod pin 43, these 12 assemblies having been designated by the letters A to L inclusive, beginning with the exhaust-valve assembly of cylinder No. 1 and ending with the exhaust-valve assembly of cylinder No. 6, reference to Figure 4 indicating the relative positions of the crank-pins of the valve-shaft for the 12 different assemblies.

From Figure 3 it will be seen that the distance from the center-line 100 of the engine to assembly G is equal to the distance from such center-line to the assembly F, and that the corresponding distance from the center-line 100 to assembly H is the same as the distance from the center-line to the assembly E, and, in like manner, assembly I and assembly D are equally distant from the same center-line as assembly J and C respectively, and, in addition, assembly K and B are equally distant from such center-line and assembly L and A in the same manner.

Looking now at Figure 4, we find that assemblies G and F which we know to be equally distant from the center-line of the engine are directly opposite each other when viewed from the end of the shaft; that is, they are 180° out of phase, and, likewise, pin H is directly opposite pin E, pin I is likewise opposite pin D, pin J opposite pin C, pin K opposite pin B and pin L opposite pin A.

It is evident that any crank-pin of the valve-shaft 39, which, of course, represents the large end of the corresponding valve connecting-rod 38 of any valve-assembly will have another equal pin disposed exactly 180° away from it and this second pin will be at the same distance from the mid-point of the valve-shaft.

Thus, if we start with pin A which represents the position of the large end of the valve connecting-rod of No. 1 exhaust-valve assembly, we find that it is at a distance $f$ from the mid line of the valve-shaft of the engine and that pin L which is 180° out of phase to pin A is also at a like distance $f$ from the center line of the engine.

This condition will be found to hold true for any given crank-pin that is chosen as a starting point—that is to say—it will have an equal complement as referred to.

Referring to Figure 6 wherein the valve-assemblies A—L are numbered 1 to 6 and I represents the intake valve-assembly and E the exhaust valve-assembly, it will be seen that this figure presents the vector-analysis force diagram developed by tracing the forces set up at each one of these valve-assemblies A through L, the force at each pin being shown as a vector in such diagram, and it is evident that there is no resultant force free in the system, as the resultant vector of the diagram is equal to zero, the diagram being known as "closed."

Referring to Figure 7, in which the vectors represent couples developed by the valve-assemblies with all of these couples measured about the mid-point of the valve-shaft, it is apparent that forces in opposite directions and equally distant from such mid-point of the valve-shaft will produce equal couples of similar phase, and that assemblies A to L, being farthest from the mid-point of the valve-shaft, will produce the largest couples, since the forces are the same at each valve-assembly.

Each vector in this diagram was determined by multiplying the force at each valve-shaft throw by the distance between such throw and the middle point of the length of the valve-shaft, and, for throws on one side of such middle point of the shaft, the phase or direction of the couple-vector is the same as that of the force-vector for the same throw, whereas, for throws on the other side of such middle point, the phase or direction of the couple-vector is opposite to that of the force-vector for the same throw, because the throw may be considered as at a negative distance from the middle point of the shaft.

On this vector-diagram this can be seen from the fact that the vector marked I—E, which represents assembly A, and 6—E, which represents assembly L, are the longest in the diagram. This vector-diagram does not close, the trace of all 12 vectors shown failing to close by a distance R.

In other words, there is a resultant couple in the direction and of the amount represented by such vector "R" and, therefore, we see from the vector-analysis of the system that, whereas the primary forces are balanced, the primary couples are unbalanced.

As before explained, each throw is in such a position that there is another throw on the shaft 180° out of phase with it, the result of such condition being that the primary force of each throw is cancelled by the primary force of the throw at 180° out of phase with it. However the distance separating any throw from that throw which is 180° out of phase with it is not a fixed distance.

As an example of this, throw or pin G is 180° out of phase with pin or throw F and the distance between G and F along this shaft is equal to 2a; however, throw A is 180° out of phase with throw L and the distance along the shaft between these two is equal to 2f which is many times the distance 2a.

This variable distance separating each throw or pin from the companion one which is 180° out of phase with it is, in this mechanism, the moment-arm, and, therefore, pins or throws A and L, being separated by a large moment-arm, will produce a very much greater moment than pins or throws G and F, which are separated by a relatively small moment arm.

This variation in moment-arm causes the differences in the lengths of the several vectors making up the diagram presented in Figure 7.

In order to overcome, as far as possible, this unbalanced couple in the valve-mechanism, some method had to be invented for reducing this resultant R.

Since it is not possible to change the phase relationship of the different valve-assemblies A through L, except to a very restricted degree, if at all, the trouble could not be corrected by that means, particularly in view of the fact that the phase relationship of the various valves had already been chosen to afford the best possible conditions of valve-gear balance.

Likewise, it is impossible, or at least very impractical, to attempt to modify the length of the moment-arm separating various pairs of throws of the valve-shaft, as this would necessitate altering the distance between different cylinders in the engine, but it is possible and practical to make the right-hand and left-hand valve-lugs or valve-operating members 37 of different weights for different valve-assemblies, A through L.

A study of Figure 7 indicates that some of the couple-vectors are in a direction such that increasing their length would decrease the length of the resultant and this is the effect or outcome desired.

The vectors in Figure 7 to which it would be desirable to add length are characterized

C    E    H    J
2—I, 3—E, 4—E, 5—I and, as a matter of fact, it is also advantageous to add weight to two very short unmarked vectors between E         H
3—E and 4—E which represent valve-assemblies F         G
3—I and 4—I Vector 2—I is represented by the valve-gear assembly C, vector 3—E by valve-gear assembly E, vector 4—E by valve-gear assembly H, and vector 5—I by valve-gear assembly J, the two short vectors representing 3—I and 4—I being characterized on the other drawings as F and G.

Figure 2 shows the right-hand and left-hand valve-lugs, and the guide portions 41 of these lugs are drilled to different diameters in order to obtain the various weights required for the several valve-assemblies.

If it were practical to employ a very heavy assembly at C and another at J, these, in combination with some addition of weight at A and L, would then be sufficient to remove the unbalanced couple from the system; but practical requirements of the construction make it desirable to break the added weight into smaller parts, so that it can be used advantageously without necessitating changes in the construction of the engine.

There are six heavy lugs—three right-hand and three left-hand, two medium size or weight lugs, one right-hand and one left-hand; four light lugs—two right-hand and two left-hand and the results of this particular addition of weights are shown by the vector-analysis in Figure 8 which is a couple-diagram, it being evident that no change has been made in the condition of the 0 unbalanced force, because for each addition of weight at any given station, such as C, equal weight has been added to the valve-gear assembly 180° out of phase, such as J, and, hence, the forces remain balanced.

The couple-vectors presented in Figure 8 form a closed diagram, there now being no unbalanced couple. Vectors representing valve-gear assemblies to which weight has been added are longer in proportion to the amount of the supplemental weight, and, as can be seen in the diagram, the amounts of added weight were so chosen as to bring the resultant vector to 0.

Thus, the primary unbalanced couple has been eliminated and, although a slight secondary unbalanced force has been introduced, this is of small magnitude and of such frequency as to be negligible in its effect on the engine.

However, had such secondary unbalanced force been large enough to be detrimental, it could have been reduced or eliminated by a different choice of weighted assemblies in the mechanism; that is, weight would have been added in different proportions and perhaps to different valve-gear assemblies.

Some combination of weights would have been found that would both eliminate the primary couple and either reduce or negative the secondary unbalanced force, but this procedure might have required a larger percentage of added weight than was actually employed.

It will be observed that the small pins 43 of the connecting-rods of the valves are so located that extensions of their lines-of-action would pass through the center-line of the valve-shaft, this arrangement avoiding all odd harmonics of higher order than the primary from the unbalanced forces and/or couples produced at any valve-shaft throw and reducing to a minimum the side-thrust forces imposed on the pins by a valve-rod of given length.

As to the mechanical construction of the engine or its equivalent, this may be changed more or less within suitable limits without departure from the present invention defined in the following claims which should be construed as generically as the prior art will permit and maintain their inherent validity.

I claim:

1. A construction of the internal-combustion engine type having in combination, a total of at least three reciprocatory valve-gears, and means to reciprocate said valve-gears in different phase-relationships, corresponding reciprocating members of said valve-gears being of different weights in order to improve the dynamic balance of said system of valve-gears.

2. A construction of the internal-combustion engine type having in combination, at least two cylinders, a pair of reciprocatory valve-gears for each cylinder, means to reciprocate said valve-gears in different phase-relationships, corresponding reciprocating members of said valve-gears being of different weights in order to improve the dynamic balance of the system of valve-gears.

3. A construction of the internal-combustion engine type having in combination a total of at least three reciprocatory-valves, a reciprocatory-guide for and operatively joined to each of said valves, and means to reciprocate said valves and guides in different phase-relationships, said guides being of different weights in order to improve the dynamic balance of said system of valve-assemblies.

4. A construction of the internal-combustion engine type having, in combination a total of at least three reciprocatory-valves, a valve-crank-shaft, means to rotate said valve-crank-shaft, connecting-rods actuated by said crank-shaft and joined to said valves at points whose lines of travel if extended would pass through the axis of said crank-shaft, reciprocating parts of said valve-assemblies having different phase-relationships and being of different weights in order to improve the dynamic balance of said system of valve-assemblies.

5. A construction of the internal-combustion engine type having in combination a total of at least three reciprocatory-valves, a reciprocatory-guide for and operatively joined to each of said valves, a valve-crank-shaft, means to rotate said valve-crank-shaft, and connecting-rods actuated by said crank-shaft and joined to said valves and guides at points whose lines of travel if extended would pass through the axis of said shaft, said connecting-rods reciprocating said valves and guides in different phase-relationships, said guides being of different weights in order to improve the dynamic balance of said valve-mechanism.

RANSOM S. THOMPSON.